(12) United States Patent
Rademacher

(10) Patent No.: US 11,297,767 B2
(45) Date of Patent: Apr. 12, 2022

(54) AGRICULTURAL WORK MACHINE FOR PERFORMING AN AGRICULTURAL WORK PROCESS

(71) Applicant: CLAAS Selbstfahrende Erntemaschinen GmbH, Harsewinkel (DE)

(72) Inventor: Thomas Rademacher, Waldalgesheim (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 521 days.

(21) Appl. No.: 16/202,406

(22) Filed: Nov. 28, 2018

(65) Prior Publication Data
US 2019/0183045 A1 Jun. 20, 2019

(30) Foreign Application Priority Data
Dec. 19, 2017 (DE) .......................... 102017130435.5

(51) Int. Cl.
*A01D 41/127* (2006.01)
(52) U.S. Cl.
CPC ....... *A01D 41/127* (2013.01); *A01D 41/1277* (2013.01)
(58) Field of Classification Search
CPC .............. A01D 41/127; A01D 41/1277; B60K 2370/162; B60K 2370/168; B60K 2370/188; B60K 2370/191; G06F 3/0484; G06F 3/0488; G06F 3/04847; G06F 3/0613; B60W 2300/15
See application file for complete search history.

(56) References Cited

U.S. PATENT DOCUMENTS 6,726,559 B2 * 4/2004 Bischoff .............. A01D 41/127
460/1
6,863,604 B2 3/2005 Behnke
(Continued)

FOREIGN PATENT DOCUMENTS

| DE | 102015122269 A1 | 6/2017 |
| EP | 2322028 A1 | 5/2011 |
| EP | 3178307 A1 | 6/2017 |

OTHER PUBLICATIONS

European Search Report for European Patent Application No. 18200328.5-1006 dated Jun. 25, 2019.

*Primary Examiner* — Christian Chace
*Assistant Examiner* — Shayne M. Gilbertson
(74) *Attorney, Agent, or Firm* — Lempia Summerfield Katz LLC

(57) ABSTRACT

An agricultural work machine for performing an agricultural work process is disclosed. The agricultural work machine includes working units and a driver assistance system for controlling the working units to achieve one or more quality criteria. The driver assistance system may set parameters to control the working units in order to satisfy the criteria. Further, the driver assistance system includes a graphical user interface through which an operator may change the setting of one of the quality criteria. Responsive to the change, the driver assistance system may determine the expected effects on other quality criteria. In addition, the driver assistance system may visually highlight the expected effects on the graphical user interface.

20 Claims, 6 Drawing Sheets

(56) References Cited

U.S. PATENT DOCUMENTS

| | | |
|---|---|---|
| 9,516,812 B2 | 12/2016 | Baumgarten et al. |
| 10,126,929 B2 | 11/2018 | Baumgarten et al. |
| 10,426,087 B2 * | 10/2019 | Bruns .................. A01D 41/127 |
| 2010/0071329 A1 * | 3/2010 | Hindryckx ........... A01D 41/127 56/10.2 R |
| 2010/0125788 A1 * | 5/2010 | Hieronymus ........ A01D 41/127 700/83 |
| 2010/0217474 A1 | 8/2010 | Baumgarten et al. |
| 2017/0160916 A1 | 6/2017 | Baumgarten et al. |
| 2017/0188515 A1 | 7/2017 | Baumgarten et al. |
| 2019/0059222 A1 * | 2/2019 | Kelber ............... A01D 41/1277 |

* cited by examiner

AGRICULTURAL WORK MACHINE FOR PERFORMING AN AGRICULTURAL WORK PROCESS

CROSS REFERENCE TO RELATED APPLICATION

This application claims priority under 35 U.S.C. § 119 to German Patent Application No. DE 102017130435.5, filed Dec. 19, 2017, the entire disclosure of which is hereby incorporated herein by reference.

TECHNICAL FIELD

The technical field relates to an agricultural work machine. More specifically, the technical field relates to an agricultural work machine that includes a plurality of working units and a driver assistance system, with the driver assistance system controlling the plurality of working units.

BACKGROUND

A driver assistance system may monitor adjustable parameters and sensor-detectable quality criteria of the working units of the agricultural work machine. In so doing, a user's specification of a process strategy seeks to achieve and maintain at least one quality criterion via the driver assistance system's mutual control of the working units. Accordingly, the driver assistance system accounts for interactions between the working units, such as a resultant change in one adjustable parameter of one working unit, so that the driver assistance system may control other working units for an optimized result for a specified process strategy. The operator uses a graphical user interface, linked to the driver assistance system, in order to specify the process strategy. Specifically, the graphical user interface allows the operator to vary a contemplated degree of fulfillment of a quality criterion. In this way, the operator is given the opportunity to dictate the process strategy.

One such agricultural work machine with a driver assistance system is disclosed in U.S. Pat. No. 10,126,929, incorporated by reference herein in its entirety. U.S. Pat. No. 10,126,929 discloses a driver assistance system for an agricultural work machine with a graphical user interface that enables the weighting of a specific quality criterion to be changed and relatedly visualizes the shift of the weighting between two contrary quality criteria. Hence, for example, the shift of the weighting between the contrary quality criteria of "broken grain" and "threshing" toward "threshing" causes the adjustable parameters of the working unit provided for threshing to be correspondingly adapted to achieve a stronger threshing of the grain so that the broken grain portion accordingly naturally also rises.

DESCRIPTION OF THE FIGURES

The present application is further described in the detailed description which follows, in reference to the noted plurality of drawings by way of non-limiting examples of exemplary implementation, in which like reference numerals represent similar parts throughout the several views of the drawings, and wherein.

DETAILED DESCRIPTION

Figure 1:
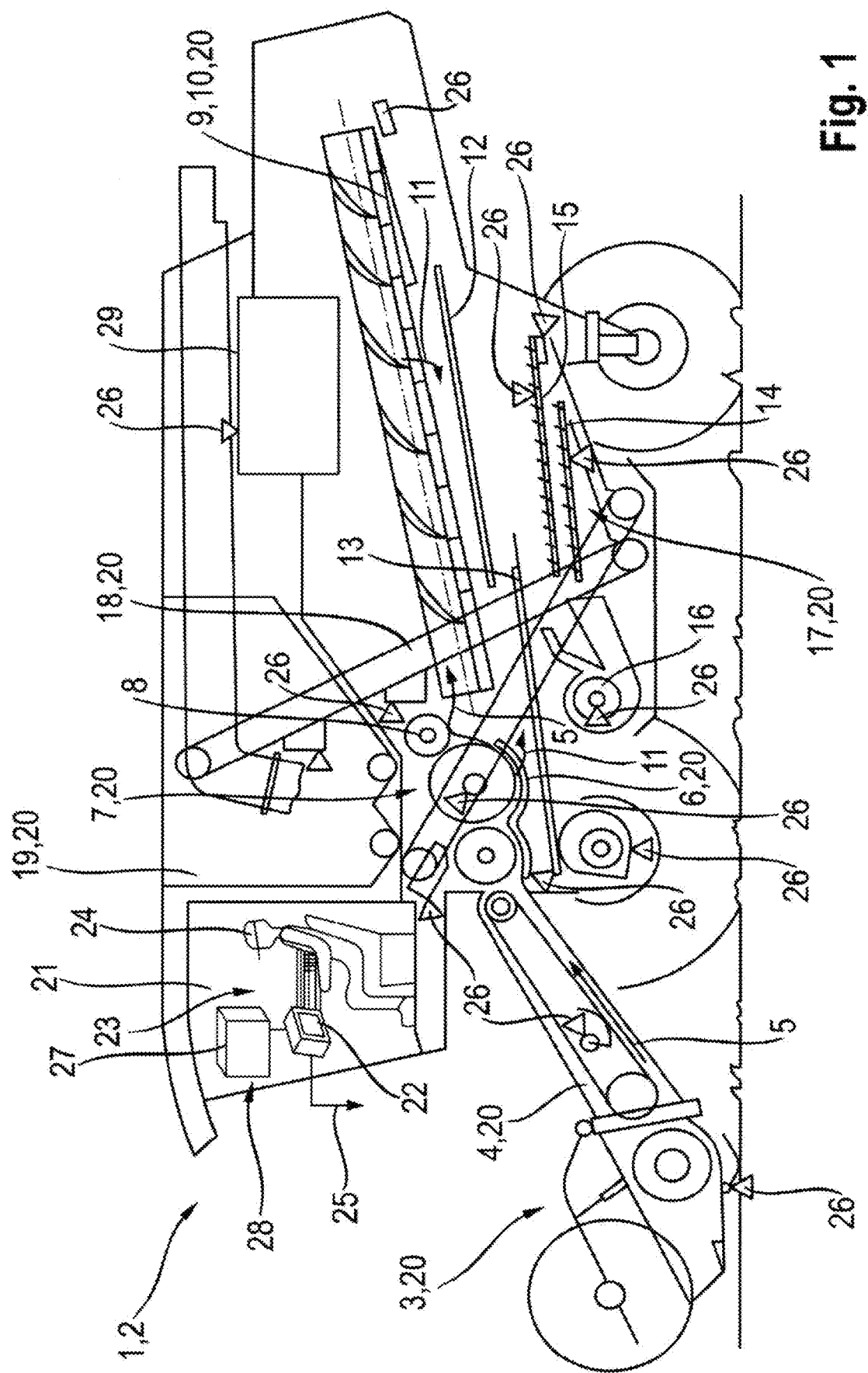
FIG. 1 illustrates a schematic representation of an agricultural work machine designed as a combine.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

As discussed in the background, a driver assistance system may assist the driver in controlling multiple working units of an agricultural work machine. In particular, a specific quality criterion may be weighted more strongly, as discussed above. However, weighting the specific quality criterion more strongly may simultaneously change the weighting of another quality criterion that is contrary thereto. The operator may be unaware of the effect, such as the change in the weighting of the another quality criterion.

Thus, in one implementation, a driver assistance system is configured to visualize changes, due to changes in fulfillment of at least one criterion, in another criterion using a graphical user interface. For example, the agricultural work machine may be configured to perform an agricultural work process, with the agricultural work machine including a plurality of working units and driver assistance system configured to control the plurality of working units to achieve at least one sensor-detectable quality criterion of the agricultural work process. Specific adjustable parameters may be pre-adjusted by the driver assistance system in order to control the plurality of working units in order to satisfy the at least one quality criterion of the agricultural work process. The driver assistance system may include a memory configured to save data, a computing device configured to process the data saved in the memory, and a graphical user interface (GUI). The GUI may enable an operator to change entry, such as change a value, associated with at least one quality criterion. In a specific implementation, the driver assistance system is configured to: determine, based on a change in the fulfillment of the at least one criterion, expected effects on other quality criteria; and visually highlight, using the GUI, the expected effects on the other quality criteria which may be expected based on a change (e.g., a degradation or worsening performance) of the at least one quality criterion.

In this regard, the driver assistance system may improve the processing of information by outputting, using the GUI, the expected effects on other quality criteria due to a change in the degree of fulfillment of the at least one quality criterion. Thus, as the degree of fulfillment changes (e.g., the operator changes a setting on the at least one quality criterion), the operator may be presented, via the GUI, anticipated or expected changes (e.g., degradations) in the quality criterion or quality criteria (e.g., criteria other than the at least one quality criterion that was changed by the operator). Specifically, due to changes in the underlying one quality criterion, the GUI may be used to visualize the expected effects on other quality criteria. In this way, the computing device of the driver assistance system may determine which other quality criteria may worsen due to the change in degree of fulfillment of the underlying one quality criteria. The operator may thus be shown in a direct manner the potential negative consequence of his/her changes (e.g., the operator changes a value to the underlying at least one quality criterion) so that the operator may correspondingly consider whether to accept the underlying change made.

In one implementation, to accomplish the visual feedback to the operator, the specification as to operator change and/or the corresponding expected change in the respective degree of fulfillment can be visualized and modified using at least one virtual operating element of the GUI. Thus, the driver assistance system may help the operator to more easily manage the agricultural work machine with the operator specifying changes and/or seeing potential expected changes, without appreciable distraction of the operator from the agricultural work process.

In particular, the operator may input a change to a quality criterion, such as a change in the degree of fulfillment of the quality criterion. The change may have an expected effect on another criterion (such as on a previously input value indicative of a degree of fulfillment of the another criterion). The expected effect may be highlighted to the operator, who in response may override the previously input value indicative of the degree of fulfillment of the another quality criterion, and who may be simultaneously made visually aware (via the GUI) that the previously input value indicative of the degree of fulfillment of the another quality criterion can no longer be achieved to the extent previously chosen due to a conflict with the change in the degree of fulfillment of the quality criterion and the resulting effect on the another quality criterion.

Alternatively, the currently made change in the degree of fulfillment of the quality criterion may be considered equivalent relative to a previous change of the degree of fulfillment of another quality criterion. The driver assistance system may determine the mutual effects due to the changes made to the degrees of fulfillment of the two quality criteria in combination, and may generate an output via the GUI to visualize the degradation outcome resulting therefrom that can be anticipated relative to the envisioned outcome from the adjustment of the degrees of fulfillment. The driver assistance system may further be configured to determine a suggestion, such as a compromise, for the adjustable parameters (such as suggested values for one or both of the two quality criteria) that for adaptation by the driver assistance system due to the changes in the degrees of fulfillment of the two quality criteria.

According to one implementation, the driver assistance system may be configured to determine the expected change in the degree of fulfillment of the quality criterion or quality criteria independent of implementing the change in the degree of fulfillment of the at least one quality criterion (e.g., the quality criterion subject to change by the operator). Before the change input by the operator takes effect, the driver assistance system may provide the operator with the opportunity, by the displaying and thereby emphasizing the worsening quality criteria/criterion of one, some, or all of the remaining criteria (e.g., all of the criteria except for the quality criterion subject to change by the operator). In this way, the operator may be easily and quickly informed about the effects and change to the remaining criteria if the changes are applied that would result in expected changes that deviate too strongly from the envisioned result.

In one implementation, the driver assistance system may determine the expected change in the degree of fulfillment of the quality criterion or quality criteria can be determined based on information saved in the driver assistance system. To accomplish this, the driver assistance system may access data saved in the memory, such as any one, any combination, or all of: expertise; characteristic curves or characteristic maps; internal information generated by sensors; the adjustable parameters of the working units; or the processed harvested material. In this way, the driver assistance system may determine the respective effect that a change in a degree of fulfillment of the quality criterion (subject to suggested change by the operator) may yield as an expected result for other criteria.

In one implementation, the GUI may include one or more control elements in order to allow the operator to modify one or more values associated with the criteria. For example, the one or more control elements may comprise a virtual slider, a dial, or the like. For adjusting, the graphical user interface may comprise a touch-sensitive screen that permits the adjustment of the virtual control element by touching and moving the slider or dial.

In one implementation, the driver assistance system may visualize the expected change (e.g., the expected degree of change) in a manner different from the change to the quality criterion as input by the operator. As one example, the driver assistance system may output the expected degree of change of the degrading quality criteria determined by the driver assistance system in a manner opposite the direction of adjustment of the actuated virtual control element (e.g., the virtual control element as changed by the operator).

In one implementation, the expected degree of change of the degrading quality criterion/criteria may be visualized in several ways. In one way, the expected degree of change may be represented as a column or a circular segment, with the virtual control element (e.g., slider or dial) used as part of the representation to indicate the degrading quality criterion/criteria. This type of visualization may correspond to the representation of a diagram. In this way, the operator may observe at a glance the qualitative and/or quantitative effects on other quality criteria that are anticipated from a change in the degree of fulfillment of the at least one quality criterion.

Various quality criteria are contemplated. As some examples, the quality criteria may include: "broken grain portion"; "threshing"; "cleanliness"; "straw quality"; and "throughput". In one implementation, one or more criteria may be represented in comparison to (such as contrary to) one or more other criteria. For example, the quality criteria of "broken grain portion", "threshing", "cleanliness" and "straw quality" may each be represented by the GUI in comparison with the contrary quality criterion of "throughput". These quality criteria may comprise superordinate goals whose attainment is influenced by the different working units of the work machine in a varied and mutually dependent manner. With this simplified representation, the operator may glean a basic overview of how changes of adjustable parameters for individual working units affect each other due to their individual interactions without having to check the work result of a change in the parameters of the respective working unit and its effects.

According to one implementation, the virtual control elements of the respective quality criterion may have a middle position as an initial starting position, which may comprise an initialization and be between the contrary quality criteria when initiating the driver assistance system. This initial starting position may represent a balanced consideration of the contrary quality criteria with respect to their degree of fulfillment achievable under the given operating conditions. On this basis, the operator may adjust at least one of the virtual control elements corresponding to the degree of fulfillment of a quality criterion that he/she envisions, and receives feedback via the GUI as to the expected degradation of one or more other quality criteria.

In one example, the agricultural work machine may comprise a combine. Due to the plurality of different working units and different procedural steps for harvesting and processing harvested material that are to be performed, combines are particularly suitable for being controlled by a driver assistance system.

Thus, both a system and method for operating an agricultural work machine is contemplated. Accordingly, a method is disclosed for operating an agricultural work machine configured to perform an agricultural work process with a plurality of working units and with a driver assistance system configured to control the working units to achieve at least one sensor-detectable quality criterion of the work process. The driver assistance system may pre-adjust specific adjustable parameters to control the working units in order to satisfy the at least one quality criterion of the work process. The driver assistance system may comprise a memory for saving data and a computer device for processing the data saved in the memory. The driver assistance system has a GUI through which a respective degree of fulfillment of the at least one quality criterion is changed by an entry. The driver assistance system may determine an expected effect on other quality criteria due to a change in the degree fulfillment of the at least one quality criterion. And, the GUI may visually highlight, as the degree of fulfillment for the at least one quality criterion changes, expected degradation for other quality criterion or quality criteria.

Referring to the figures, FIG. 1 illustrates an agricultural work machine 1 designed as a combine 2. The agricultural work machine 1 includes a grain header 3 in its front area that is connected in a known manner to the inclined conveyor 4 of the combine 2. The stream of harvested material 5, passing through the inclined conveyor 4, is transferred in the rear area of the inclined conveyor 4 to the threshing units 7 of the combine 2 at least partially surrounded by a so-called threshing concave 6 on the bottom. A diverter roller 8 downstream from the threshing units 7 diverts the stream of harvested material 5 out of the threshing units 7 in their rearward area so that the stream is immediately transferred to a separating device 10, which may be designed as a separating rotor 9. The stream of harvested material 5 in the rotating separating rotor 9 is conveyed such that freely movable grains 11, contained in the stream of harvested material 5, are removed in the bottom area of the separating rotor 9. Within the context of the application, the separating device 10 illustrated in FIG. 1 and designed as a separating rotor 9 may likewise be designed as a straw walker, of known design and not shown. The grains 11 deposited both on the threshing concave 6 as well as on the separating rotor 9 are fed over a returns pan 12 and a feed pan 13 of a cleaning device 17 comprising a plurality of screening levels 14, 15 and a blower 16. The cleaned flow of grains is then transferred using elevators 18 to a grain tank 19. Example working units of the agricultural machine 1 include any one, any combination, or all of: the grain header 3; the inclined conveyor 4; the threshing units 7 and the threshing concave 6 assigned to them; the separating device 10; the cleaning device 17 and its components; the elevators 18; and the grain tank 19. Other types of working units are contemplated. A drive device 29 comprises an internal combustion engine and is configured to provide the drive power needed for operating the working units 20 as well as a hydrostatic drive system.

Furthermore, the agricultural work machine 1 has a vehicle cabin 21 in which is arranged at least one control and regulating device 23, which includes a display unit 22. The control and regulating device 23 may comprise at least one microprocessor and at least one memory unit. The microprocessor of the control and regulating device 23 may comprise any type of controller, such as processor, a microcontroller, an Application Specific Integrated Circuit (ASIC), Programmable Logic Device (PLD), or Field Programmable Gate Array (FPGA), or the like. The memory unit of the control and regulating device 23 may comprise one or more types of storage medium, such as volatile memory and/or non-volatile memory. Further, the microprocessor and storage medium may be separate devices, communicating via an external bus. Alternatively, the microprocessor and storage medium may be within the same device, communicating via an internal bus. Logic, such the functionality described here (including the functionality of the evaluation unit), may be implemented in software stored in storage medium and/or stored within microprocessor. Automatic operation or control by an operator of the agricultural work machine 1, such as by using control and regulating device 23, is known to one of skill in the art and is therefore not further explained.

The control and regulating device 23 communicates, such as by bus system 25, to a plurality of different sensor systems 26 in order to detect process and adjustable parameters of the respective working units 20 and their components. Details with respect to the structure of the sensor systems 26 are described in detail in U.S. Pat. No. 6,863,604, the entire contents of which is incorporated by reference herein.

Using the sensor systems 26, one, some, any combination, or all of the following may be determined: "throughput"; "threshing"; "broken grain portion"; "cleanliness"; or "straw quality". In one implementation, the quality criterion of "throughput" is contrary to one or more other quality criteria, such as the other quality criteria of "broken grain portion" $Q1$, "threshing" $Q2$, "cleanliness" $Q3$ and "straw quality" $Q4$ to the extent that a greater degree of fulfillment in achieving the quality criterion of "throughput" $Q5$ is associated with a decrease in the degree of fulfillment of the other quality criteria due to the changes in adjustable parameters which are needed therefor. The enumeration of the aforementioned quality criteria is not to be understood as exhaustive since, depending on the working units 20, other quality criteria may be selected by the driver assistance system 28 whose degree of fulfillment can be maintained by determining optimized adjustable parameters for the working units 20. The respective degree of fulfillment may be quantifiable based on the data determinable by sensors.

Moreover, the control and regulating device 23 is coupled to a driver assistance system 28 comprising a display unit 27. In one implementation, the driver assistance system 28 may be separate from the control and regulating device 23. Further, similar to the control and regulating device 23, the driver assistance system 28 may include at least one microprocessor and at least one memory unit. In addition, logic, such the functionality described here (including the functionality of the driver assistance system 28), may be implemented in software stored in storage medium and/or stored within microprocessor. For example, the logic to operate the driver assistance system 28, such as to control the GUI, may be implemented in software and may be configured to perform the functionality as described herein. Thus, all of the discussion above regarding the computing functionality of the control and regulating device 23 may likewise be applied to the driver assistance system 28. Alternatively, the driver assistance system 28 may be integrated directly in the control and regulating device 23, and the information provided by the driver assistance system 28 may also be visualized directly in the display unit 22 assigned to the control and regulating device 23.

Figure 2:
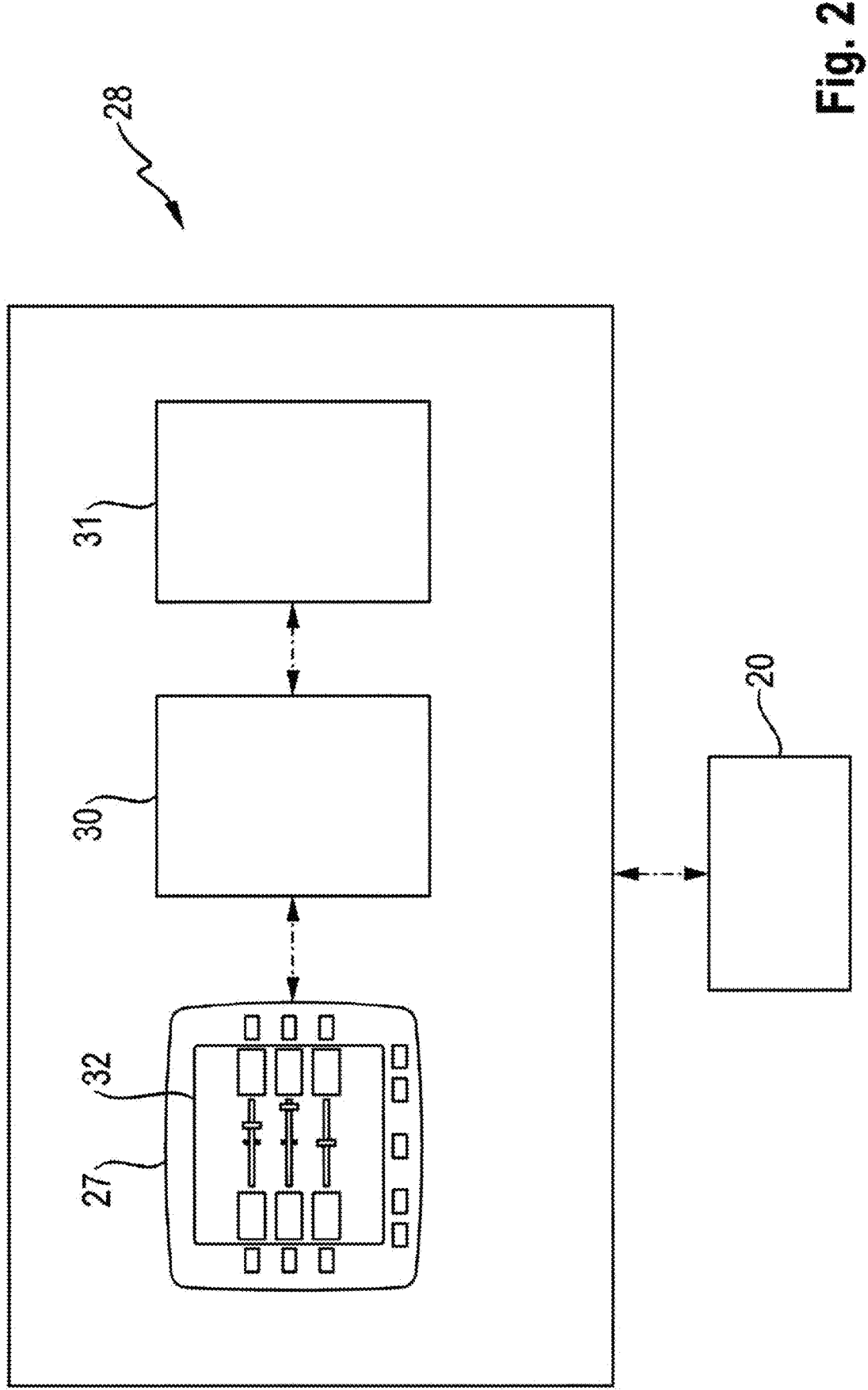
FIG. 2 illustrates a schematic representation of a driver assistance system of the agricultural work machine.

FIG. 2 represents a schematic representation of the driver assistance system 28. As discussed above, the driver assistance system 28 may comprise a memory, such as memory 30, for saving data and computing functionality, such as computing device 31, configured to process the data saved in the memory 30. In this regard, computing device 31 includes at least one microprocessor (e.g., controller, processor, ASIC, PLD, FPGA, etc.). The driver assistance system 28 may be configured to control the working units 20 to achieve the quality criteria of a work process of the combine 2 detectable by sensors. For this, adjustable parameters may be used that are controlled by the driver assistance system 28 to predetermined parameters, such as to the degree of fulfillment, and are transmitted to various actuators assigned to the working units 20 in order to correspondingly adjust or move them.

The operator may input, via display unit 27, changes to a respective parameter, such as a respective degree of fulfillment, of the at least one quality criterion. To this end, the display unit 27 may include a touch-sensitive screen 32 which forms a graphical user interface (GUI). Touch gestures may be detected by the touch-sensitive screen 32 which are converted into corresponding control commands by an evaluation by the driver assistance system 28.

Figure 3:
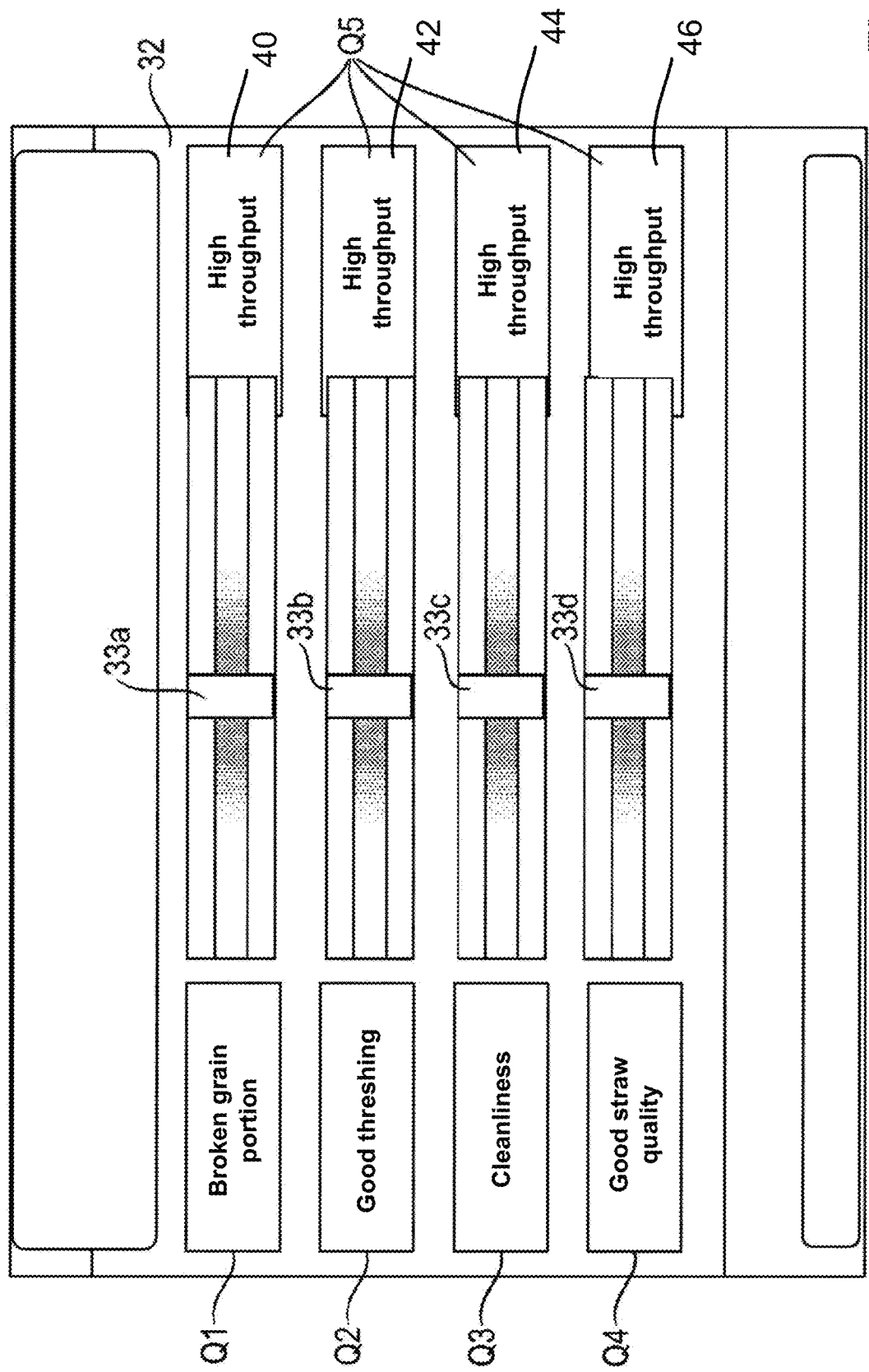
FIG. 3 illustrates a view of a menu interface of a display unit of the driver assistance system.

FIG. 3 illustrates a view of a menu interface of the display unit 27, which comprises virtual control elements 33*a*, 33*b*, 33*c*, 33*d*, and which are generated on the GUI to order to allow the operator to adjust one or more parameters, such as the degree of fulfillment (or other type of value) between respective quality criteria Q1, Q2, Q3, Q4 and the quality criterion Q5 contrary thereto. Thus, FIG. 3 illustrates multiple pairs of quality criteria which are in direct opposition to one another. For example, one quality criterion Q5 (indicated as element 40) is paired with quality criterion Q1, another quality criterion Q5 (indicated as element 42) is paired with quality criterion Q2, yet another quality criterion Q5 (indicated as element 44) is paired with quality criterion Q3, and still another quality criterion Q5 (indicated as element 46) is paired with quality criterion Q4. For a respective pairing, the degree of fulfillment may be input in the form of a slider. In this regard, the virtual control elements 33*a*, 33*b*, 33*c*, 33*d* are formed as sliders in the design illustrated in FIGS. 3-6. A design of the virtual control elements 33*a*, 33*b*, 33*c*, 33*d* as a dial is also contemplated. Still other virtual control elements are contemplated. When the driver assistance system 28 is initiated, the virtual control elements 33*a*, 33*b*, 33*c*, 33*d* are in an initial starting position in which the virtual control elements 33*a*, 33*b*, 33*c*, 33*d* assume a predetermined positions, such as a middle position, between the contrary quality criteria Q1, Q2, Q3, Q4 and Q5.

In one implementation, the driver assistance system determines evaluable or anticipated effects on the other quality criteria Q1, Q2, Q3, Q4 or Q5 depending on a change in the parameter, such as the degree of fulfillment, of at least one quality criterion Q1, Q2, Q3, Q4 or Q5 that results in a degradation. For the quality criterion or quality criteria, this expected or anticipated effect is or will be visually highlighted via the GUI 32 by the change in the degree of fulfillment for which a degradation is expected due to the change in the degree of fulfillment of another criterion.

Figure 4:
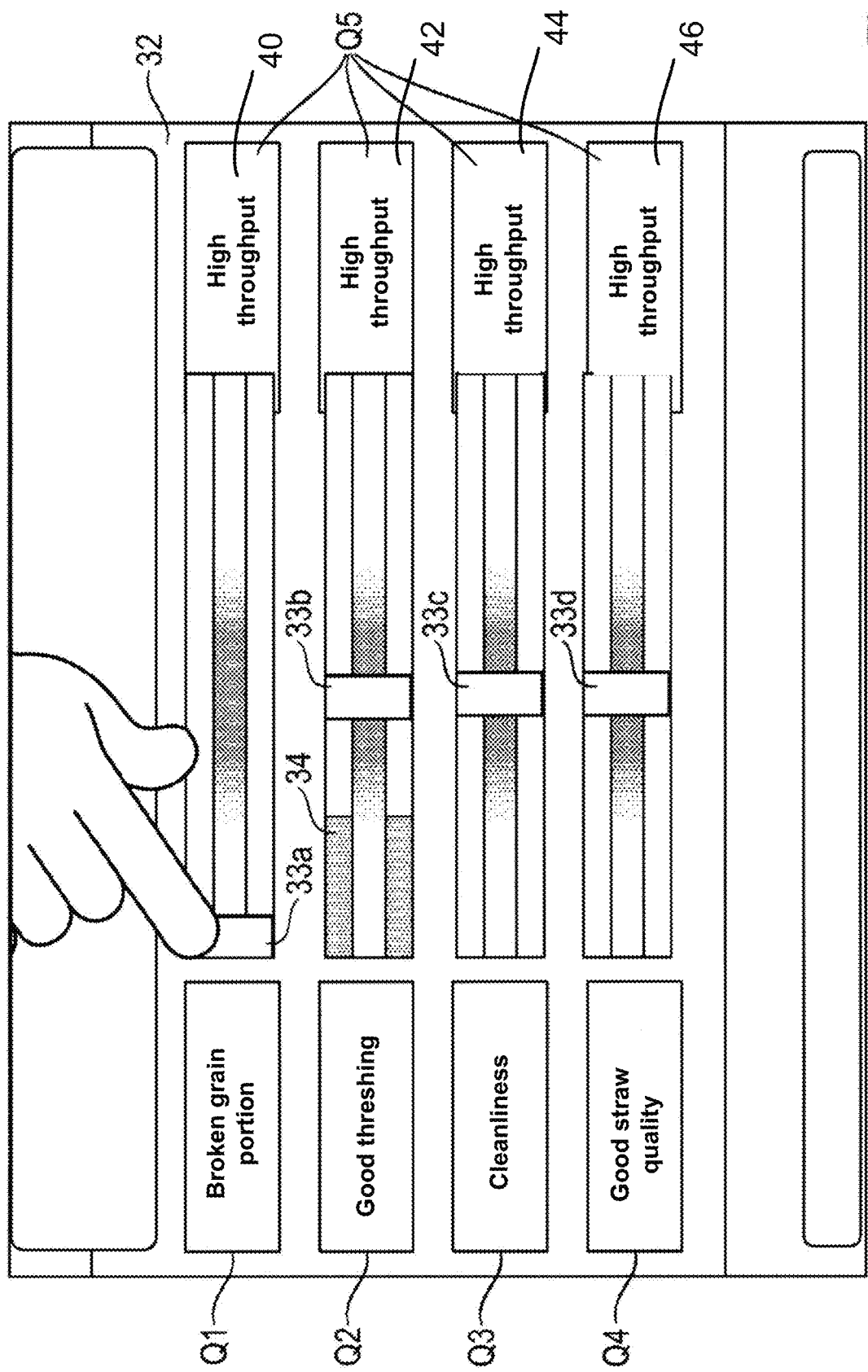
FIG. 4 illustrates a view of the menu interface of the display unit according to FIG. 3.

FIG. 4 illustrates a view of the menu interface of the display unit 27 with a control element 33*a* shifted or slid entirely toward the quality criterion Q1 (e.g., control element 33*a* is slid to the furthermost left position as shown by the hand in FIG. 4). This adjustment by the control element 33*a* causes the threshing process to be carried out with restraint in order to minimize the portion of broken grain. That is, the operator seeks to instruct the system to minimize the portion of broken grain, as indicated by the desired higher degree of fulfillment for minimizing the portion of broken grain. The degree of fulfillment of the contrary quality parameter Q5 (element 40) portrayed opposite the quality criterion Q1 necessarily decreases correspondingly. In so doing, the change in the degree of fulfillment of the quality criterion Q1 acts not just on the corresponding quality criterion Q5 (element 40), i.e., the throughput, but may also affect other criterion/criteria, such as also effecting directly on the quality criterion Q2, the threshing, which may no longer optimally occur with the changes in the adjustable parameters for the threshing units 7 and the threshing concave 6 to achieve the degree of fulfillment of the quality criterion Q1. Thus, the driver assistance system 28 may determine, responsive to the operator inputting a new degree of fulfillment of the quality criterion Q1 (e.g., moving control element 33*a*), the expected changes to one or more other criteria, such as the occurrence of degrading of the quality criterion Q2.

To illustrate this effect, the GUI may be modified in one or more ways, such as by shifting one of the virtual control elements 33*a*, 33*b*, 33*c*, 33*d*, in this case control element 33*a*, degrades the quality criterion Q2 due to the evaluation by the driver assistance system 28 of the available information and the data of the work process. The degradation to be anticipated or expected may be signaled or output to the operator in one of several ways. In one way, the degradation may be signaled to the operator in the form of a column 34 that is portrayed under the relevant virtual control element 33*b* of the degrading quality criterion Q2 in different colors, in a different pattern, or other contrast manner. In this way, the operator 24 may learn nearly at the same time as the change of the adjustment of the quality criterion Q1 of the effects on the quality criterion Q2 that would degrade. In particular, responsive to the driver assistance system 28 determining that the operator has changed one of the virtual control elements 33*a*, 33*b*, 33*c*, 33*d*, the driver assistance system may determine the expected effect on other quality criterion/criteria. If the virtual control elements 33*a*, 33*b*, 33*c*, 33*d* are designed as a dial, the degradation to be anticipated may be represented as a circle segment that is portrayed under the relevant virtual control element.

Figure 5:
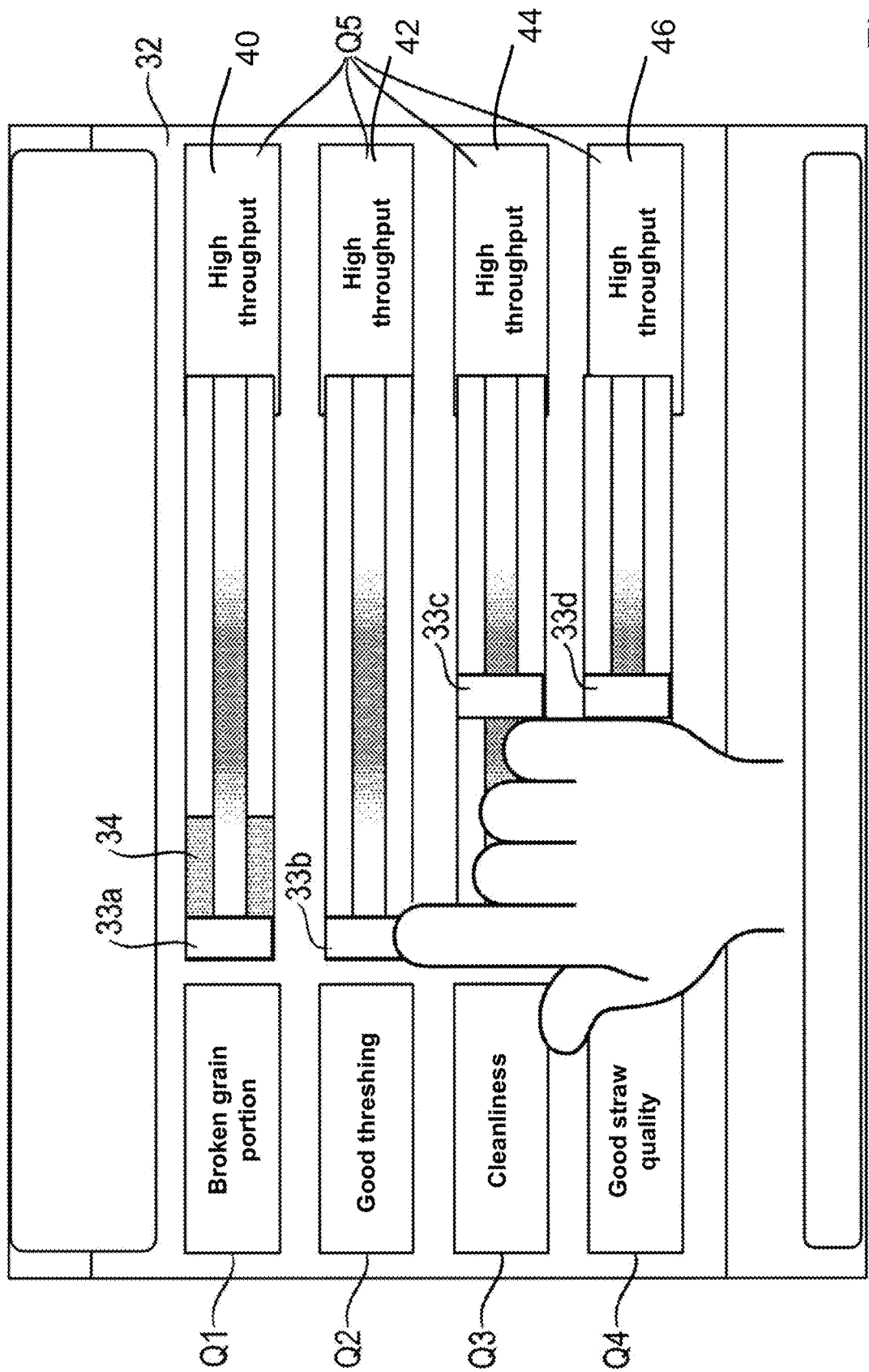
FIG. 5 illustrates another view of the menu interface according to FIG. 4.

FIG. 5 portrays another view of the menu interface according to FIG. 4 with a control element 33*b* shifted toward the quality criterion Q2 (e.g., control element 33*b* is slid to the furthermost left position as shown by the hand in FIG. 5). Shifting the other control element 33*b* at a later time causes different effects on the relevant quality criteria Q1, Q2, Q3, Q4, Q5 depending on an adjustment option with respect to prioritizing or treating equally the last performed change to the driver assistance system 28. Specifically, the driver assistance system 28 may take into account the operator input to 33*a* as shown in FIG. 4 and also the operator input to 33*b* as shown in FIG. 5.

FIG. 5 illustrates a GUI according to which the last performed change has priority, in this case the degree of fulfillment of the quality criterion Q2. For example, the operator has entered a change to the quality criterion Q2, and the GUI illustrates one or more indicia to indicate expected changes to other criterion/criteria in the event that the change to the quality criterion Q2 the operator entered is implemented. To achieve the adjusted degree of fulfillment of the quality criterion Q2 "threshing" (e.g., implementing the requested operator change to quality criterion Q2), changes in the adjustable parameters to the threshing units 7 and threshing concave 6 may be needed resulting in changes to previously entered criterion/criteria, such as changes to the same adjustable parameters made with the previous entered value for the quality criterion Q1 "broken grain". In this regard, the previously entered value for the quality criterion Q1 "broken grain" may require to be changed in order to effectuate the suggested new change by the operator to quality criterion Q2 "threshing". Since the operator may be unaware that a change to another criterion/criteria may result or may be unaware of the extent of the change to the another criterion/criteria, the GUI illustrated in FIG. 5 provides the information, such as in the form of one or more indicia, to inform the operator of the expected consequences to other criterion/criteria. In particular, if the new adjustment of the degree of fulfillment of quality criterion Q2 were adopted, the quality criterion Q1 would degenerate since the portion of broken grain would increase. This degradation is correspondingly visualized by the column 34 under the control element 33a (illustrated in FIG. 5). In so doing, the column 34 can be displayed opposite the direction of actuation of the control element 33a without changing the position of the control element 33a of the relevant quality criterion Q1. Thus, FIG. 5 illustrates one or more indicia (such as in the form of a column, which may comprise a different color, texture, shading or the like) to indicate the expected change, and may further place the indicia in the opposite direction of actuation of the control element.

Figure 6:
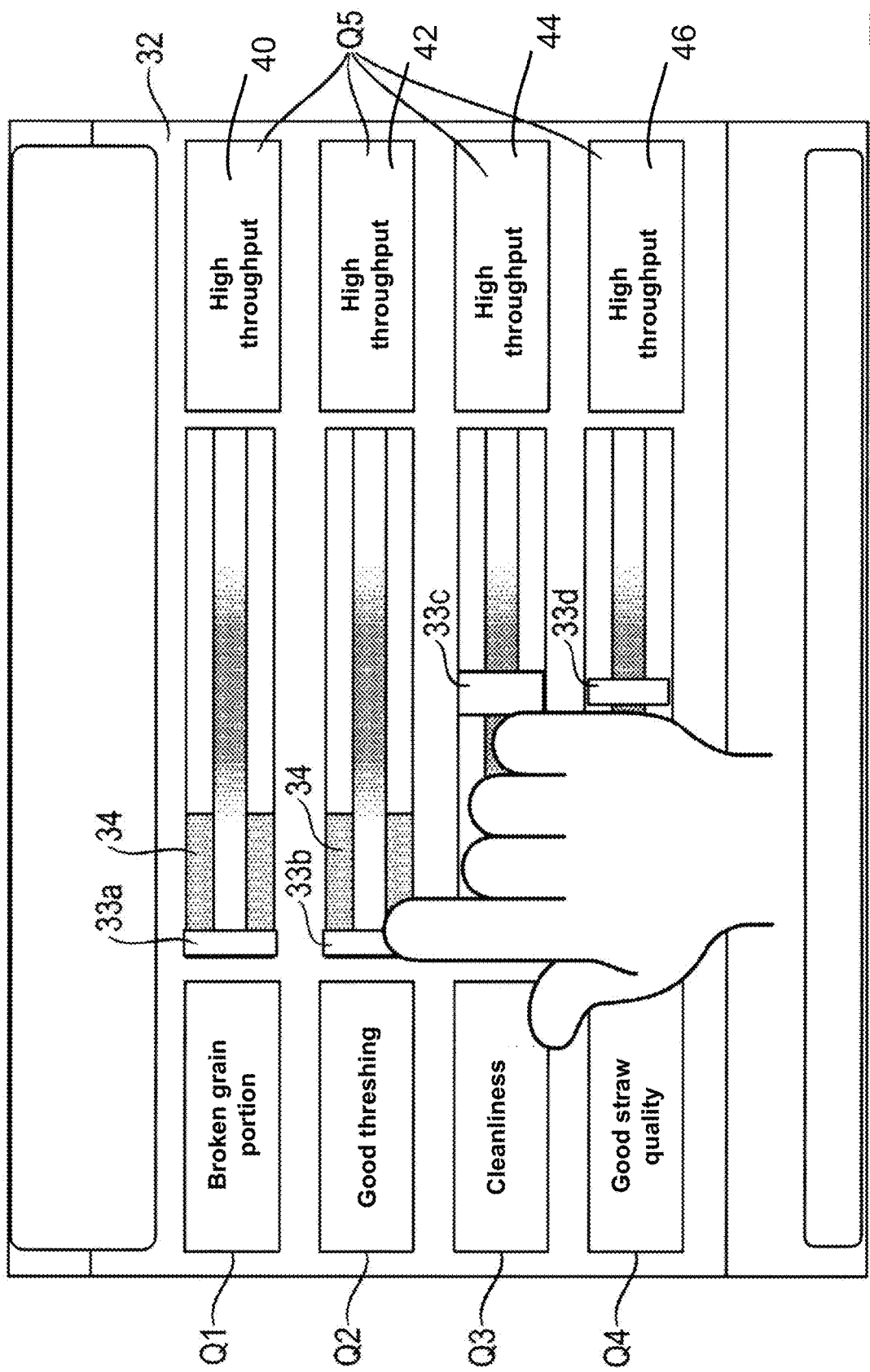
FIG. 6 illustrates a view of the menu interface according to another implementation.

FIG. 6 portrays a view of the menu interface according to FIG. 5 in which the following change in the degree of fulfillment of the other quality criterion Q2 is handled the same as the previous change in the degree of fulfillment of the quality criterion Q1. In an equivalent treatment of the quality criteria Q1 and Q2 by the driver assistance system 28, driver assistance system 28 may determine adjustable parameters of the working units 20 that represent a compromise between the achievement of the degrees of fulfillment of the two quality criteria Q1 and Q2. Since this compromise would lead to an anticipated degradation of both quality criteria Q1, Q2, columns 34 under the two control elements 33a and 33b are portrayed in order to notify the operator 24 of the degradation to be anticipated with respect to the envisioned degree of fulfillment of both quality criteria Q1, Q2. By means of a visual decision-making aid, the operator 24 can decide whether he/she will accept or modify his/her selected adjustments in order to possibly arrive at better overall results of the work process. Thus, in one implementation, the driver assistance system 28 may, responsive to operator input for a first criterion, output the anticipated effect on a remainder of other criteria. For example, FIG. 4 illustrates an expected effect on quality criterion Q2 responsive to operator input for quality criterion Q1. In a second implementation, the driver assistance system 28 may, responsive to operator input for a first criterion and a second criterion, output the anticipated effect on one or both of the first criterion or second criterion and/or on a remainder of other criteria (criteria other than the first criterion and the second criterion). As one example, FIG. 5 illustrates the anticipated effect on quality criterion Q1 (which was previously adjusted by operator) based on later operator input to quality criterion Q2. As another example, FIG. 6 illustrates the anticipated effect on both quality criterion Q1 and quality criterion Q2 based on the later operator input to quality criterion Q2. Further, the driver assistance system 28 may output indicating a balance or a compromise in response to the operator entering values for multiple criteria that may conflict with one another. Thus, in the event that the operator is unaware that the operator-entered values may conflict with one another, the driver assistance system 28 may output, via the GUI, a compromise in order to better achieve the multiple goals of the operator.

LIST OF REFERENCE NUMBERS

1 Agricultural Work machine
2 Combine
3 Grain header
4 Inclined conveyor
5 Harvested material stream
6 Threshing concave
7 Threshing unit
8 Diverter roller
9 Separating rotor
10 Separating device
11 Grains
12 Returns pan
13 Feed pan
14 Screening level
15 Screening level
16 Blower
17 Cleaning device
18 Elevator
19 Grain tank
20 Working unit
21 Vehicle cabin
22 Display unit
23 Control and regulating device
24 Operator
25 Bus system
26 Sensor system
27 Display unit
28 Driver assistance system
29 Drive device
30 Memory
31 Computer device
32 Graphical User interface (GUI)
33a Virtual control element
33b Virtual control element
33c Virtual control element
33d Virtual control element
34 Column
Q1 Quality criterion
Q2 Quality criterion
Q3 Quality criterion
Q4 Quality criterion
Q5 Quality criterion Each of the items listed above may be associated with a single electronic device or may be combined within a single electronic device. Further, with regard to each separate electronic device, processing/memory functionality may be included.

The methods, devices, processing, circuitry, and logic described above may be implemented in many different ways and in many different combinations of hardware and software. As discussed above, a microprocessor and a memory unit may be used. The microprocessor and memory unit are merely one example of a computational configuration. Other types of computational configurations are contemplated. For example, all or parts of the implementations may be circuitry that includes a type of controller, including as an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may implement the functionality described herein and may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

The invention claimed is:

1. An agricultural work machine configured to perform an agricultural work process with a plurality of working units, the agricultural work machine comprising:
 a driver assistance system configured to control the plurality of working units to achieve at least one sensor-detectable quality criterion of the agricultural work process and comprising a memory, a computing device, and a graphical user interface (GUI), the memory configured to store data, the computing device configured to process the data stored in the memory;
 wherein the driver assistance system is configured to specify adjustable parameters to control the plurality of working units in order to satisfy a plurality of quality criteria of the agricultural work process,
 wherein the GUI includes an indicia to enable manual entry from an operator indicative of a respective degree of fulfillment of at least one quality criterion selected from the plurality of quality criteria and one or more indicia to enable manual entry from the operator indicative of a respective degree of fulfillment of one or more remaining quality criterion selected from the plurality of quality criteria;
 wherein the driver assistance system is configured to receive, via the GUI, the manual entry from the operator indicative of the respective degree of fulfillment of the at least one quality criterion selected from the plurality of quality criteria, the manual entry indicative of a change to the respective degree of fulfillment of the at least one quality criterion,
 wherein, responsive to receiving the manual entry, the driver assistance system is configured to determine an expected effect degradation on a degree of fulfillment of the one or more remaining quality criteria selected from the plurality of quality criteria, and
 wherein the driver assistance system is configured to visually highlight, using the GUI, an indication of the expected effect degradation on the degree of fulfillment of the one or more remaining quality criteria while also outputting on the GUI the one or more indicia indicative of a current respective degree of fulfillment of the one or more remaining quality criteria and enabling manual entry from the operator to change the respective degree of fulfillment for the one or more remaining quality criteria thereby highlighting the expected degradation.

2. The agricultural work machine of claim 1, wherein the driver assistance system is configured to input, via the indicia on the GUI and from the operator, a first change to the degree of fulfillment of a first quality criterion and a second change to the degree of fulfillment of a second quality criterion, the first change being input prior in time to the second change, the first quality criterion and the second quality criterion being selected from the plurality of quality criteria; and
 wherein the driver assistance system is configured to prioritize the second change to the degree of fulfillment of the second quality criterion over the first change to the degree of fulfillment of the first quality criterion.

3. The agricultural work machine of claim 1, wherein the driver assistance system is configured to input, via the indicia on the GUI and from the operator, a first change to the degree of fulfillment of a first quality criterion and a second change to the degree of fulfillment of a second quality criterion, the first change being input prior in time to the second change, the first quality criterion and the second quality criterion being selected from the plurality of quality criteria; and wherein the driver assistance system is configured to consider the second change to the degree of fulfillment of the second quality criterion as equivalent to the first change to the degree of fulfillment of the first quality criterion.

4. The agricultural work machine of claim 1, wherein the driver assistance system is configured to visually highlight, using the GUI, the expected degradation on the degree of fulfillment of the one or more remaining quality criteria using at least one of a virtual slider or dial.

5. The agricultural work machine of claim 1, wherein the manual entry indicative of the change to the indicia on the respective degree of fulfillment of the at least one quality criterion comprises an actuation of a virtual control element, the actuation indicative of a direction of adjustment of the virtual control element; and wherein the driver assistance system is configured to visually highlight the expected degradation on the degree of fulfillment of the one or more remaining quality criteria opposite to the direction of the adjustment of the virtual control element.

6. The agricultural work machine of claim 5, wherein the one or more remaining quality criteria comprises a degraded quality criterion;

wherein the degraded quality criterion has associated therewith a degraded quality criterion virtual control element; and wherein the expected degradation on the degree of change of the degraded quality criterion is visualized by a representation associated with the degraded quality criterion virtual control element.

7. The agricultural work machine of claim 6, wherein the representation associated with the degraded quality criterion virtual control element comprises a column or a circular segment that is represented in the GUI under the degraded quality criterion virtual control element.

8. A method for operating an agricultural work machine configured to perform an agricultural work process with a plurality of working units, the agricultural work machine including a driver assistance system for controlling the plurality of working units in order to achieve at least one sensor-detectable quality criterion of the agricultural work process, the method comprising:

setting, by the driver assistance system, parameters, the parameters used by the driver assistance system to control the plurality of working units in order to satisfy at least one quality criterion of the agricultural work process, the at least one quality criterion selected from a plurality of quality criteria;

receiving, via a graphical user interface (GUI) of the driver assistance system, a manual entry from an operator indicative of a respective degree of fulfillment of the at least one quality criterion selected from the plurality of quality criteria, the manual entry indicative of a change to the respective degree of fulfillment of the at least one quality criterion, wherein the GUI includes an indicia to enable the manual entry from the operator indicative of the respective degree of fulfillment of the at least one quality criterion selected from the plurality of quality criteria and one or more indicia to enable manual entry from the operator indicative of a respective degree of fulfillment of one or more remaining quality criterion selected from the plurality of quality criteria;

responsive to receiving the manual entry, determining, by the driver assistance system, an expected degradation on a degree of fulfillment of the one or more remaining quality criteria selected from the plurality of quality criteria; and visually highlighting, using the GUI, an indication of the expected degradation on the degree of fulfillment of the one or more remaining quality criteria while also outputting on the GUI the one or more indicia indicative of a current respective degree of fulfillment of the one or more remaining quality criteria and enabling manual entry from the operator to change the respective degree of fulfillment for the one or more remaining quality criteria thereby highlighting the expected degradation.

9. The method of claim 8, wherein the driver assistance system determines the expected degradation on the degree of fulfillment of the one or more remaining quality criteria selected from the plurality of quality criteria independently of implementing the change for the respective degree of fulfillment of the at least one quality criterion; and wherein the driver assistance system determines the expected degradation on the degree of fulfillment of the one or more remaining quality criteria based on information saved in the driver assistance system.

10. The method of claim 8, wherein the manual entry indicative of the change to the indicia on the respective degree of fulfillment of the at least one quality criterion comprises an actuation of a virtual control element, the actuation indicative of a direction of adjustment of the virtual control element; and wherein the driver assistance system visually highlights the expected degradation on the degree of fulfillment of the one or more remaining quality criteria opposite to the direction of the adjustment of the virtual control element.

11. The method of claim 10, wherein the one or more remaining quality criteria comprises a degraded quality criterion;

wherein the degraded quality criterion has associated therewith a degraded quality criterion virtual control element; and wherein the expected degradation on the degree of change of the degraded quality criterion is visualized by a representation associated with the degraded quality criterion virtual control element.

12. The method of claim 11, wherein the representation associated with the degraded quality criterion virtual control element comprises a column or a circular segment that is represented in the GUI under the degraded quality criterion virtual control element.

13. The agricultural work machine of claim 1, wherein the indication of the expected degradation on the degree of fulfillment of the one or more remaining quality criteria is generated using the GUI relative to the indicia of the current respective degree of fulfillment of the one or more remaining quality criteria.

14. The agricultural work machine of claim 13, wherein the indicia of the current respective degree of fulfillment of the one or more remaining quality criteria is represented via a current virtual control element configured to receive the manual entry; and wherein the indication of the expected degradation on the degree of fulfillment of the one or more remaining quality criteria is generated using the GUI relative to the current virtual control element.

15. The agricultural work machine of claim 14, wherein the indication of the expected degradation on the degree of fulfillment of the one or more remaining quality criteria is generated using the GUI under or adjacent to the current virtual control element.

16. The agricultural work machine of claim 14, wherein the current virtual control element includes at least one aspect; and wherein the indication of the expected degradation on the degree of fulfillment of the one or more remaining quality criteria is generated using the GUI to contrast the at least one aspect of the current virtual control element.

17. The agricultural work machine of claim 14, wherein the one or more remaining quality criteria has a range of potential values;

wherein the current virtual control element is positioned in the range of potential values to indicate a value of the current respective degree of fulfillment; and wherein the indication of the expected degradation is positioned at a different part in the range of potential values to indicate at least one aspect of the expected degradation.

18. The method of claim 8, wherein the indication of the expected degradation on the degree of fulfillment of the one or more remaining quality criteria is generated using the GUI relative to the indicia of the current respective degree of fulfillment of the one or more remaining quality criteria.

19. The method of claim 18, wherein the indicia of the current respective degree of fulfillment of the one or more remaining quality criteria is represented via a current virtual control element; and wherein the indication of the expected degradation on the degree of fulfillment of the one or more remaining quality criteria is generated using the GUI relative to the current virtual control element.

20. The method of claim 19, wherein the indication of the expected degradation on the degree of fulfillment of the one or more remaining quality criteria is generated using the GUI under or adjacent to the current virtual control element.

* * * * *